United States Patent
Melgar et al.

(10) Patent No.: US 10,585,433 B2
(45) Date of Patent: Mar. 10, 2020

(54) METHODS AND APPARATUS FOR AUTOMOTIVE DRIVE MODE SELECTION

(71) Applicant: Ford Global Technologies, LLC, Dearborn, MI (US)

(72) Inventors: Christopher Melgar, Birmingham, MI (US); Peter Simeon Lazarevski, Dearborn, MI (US); Rinku Patel, Kalamazoo, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/688,753

(22) Filed: Aug. 28, 2017

(65) Prior Publication Data

US 2019/0064812 A1 Feb. 28, 2019

(51) Int. Cl.
*G05D 1/00* (2006.01)
*B60W 30/16* (2012.01)
*G05D 1/02* (2006.01)

(52) U.S. Cl.
CPC .......... *G05D 1/0088* (2013.01); *B60W 30/16* (2013.01); *G05D 1/0055* (2013.01); *G05D 1/0061* (2013.01); *G05D 1/0246* (2013.01); *B60W 2550/40* (2013.01); *G05D 2201/0213* (2013.01)

(58) Field of Classification Search
CPC .......... B60W 30/16; B60W 2550/40; G05D 1/0061; G05D 1/0055; G05D 1/0246; G05D 1/0088; G05D 2201/0213
See application file for complete search history.

(56) References Cited

U.S. PATENT DOCUMENTS

| | | | | |
|---|---|---|---|---|
| 9,321,461 | B1* | 4/2016 | Silver | B60W 30/0956 |
| 9,663,118 | B1* | 5/2017 | Palmer | B60W 50/082 |
| 9,840,254 | B2* | 12/2017 | Gupta | B60Q 1/346 |
| 9,947,052 | B1* | 4/2018 | Slusar | G06Q 40/08 |
| 10,077,056 | B1* | 9/2018 | Fields | B60W 40/09 |
| 2012/0203424 | A1* | 8/2012 | Filev | B60W 50/00 701/36 |
| 2013/0184926 | A1* | 7/2013 | Spero | B62D 1/28 701/26 |
| 2013/0304513 | A1* | 11/2013 | Hyde | G06Q 40/08 705/4 |

(Continued)

FOREIGN PATENT DOCUMENTS

| | | |
|---|---|---|
| CN | 105539451 | 5/2016 |
| CN | 106427840 | 2/2017 |

(Continued)

*Primary Examiner* — Mussa A Shaawat
(74) *Attorney, Agent, or Firm* — Ray Coppielle; Hanley, Flight & Zimmerman, LLC

(57) ABSTRACT

Methods, apparatus, and systems for automotive drive mode operation are disclosed. A disclosed method includes receiving information relating to a condition of a vehicle from a vehicle sensor module, comparing the information to a drive mode threshold, and selecting a drive mode change based on the information satisfying the drive mode threshold. The disclosed method also includes sending the drive mode change to a first vehicle operation module, the first vehicle operation module operating at least one other vehicle operation module to adjust vehicle operation based on the drive mode change.

21 Claims, 4 Drawing Sheets

(56) References Cited

U.S. PATENT DOCUMENTS

| | | | |
|---|---|---|---|
| 2014/0129100 A1* | 5/2014 | Nellums | B60W 10/04 701/58 |
| 2015/0198247 A1* | 7/2015 | Yahagi | B60K 31/0058 701/52 |
| 2015/0224979 A1* | 8/2015 | Grenn | B60W 20/00 701/22 |
| 2015/0314780 A1* | 11/2015 | Stenneth | B60W 30/00 701/23 |
| 2015/0375757 A1* | 12/2015 | Schiek | B60W 50/14 701/23 |
| 2016/0139594 A1* | 5/2016 | Okumura | B60W 30/00 701/2 |
| 2016/0251003 A1* | 9/2016 | Weihl | B60T 7/12 701/70 |
| 2016/0264021 A1* | 9/2016 | Gillett | B60K 1/04 |
| 2017/0023945 A1* | 1/2017 | Cavalcanti | G08G 1/0116 |
| 2017/0072958 A1 | 3/2017 | Prakah-Asante et al. | |
| 2017/0166222 A1* | 6/2017 | James | B60W 50/14 |
| 2017/0190331 A1* | 7/2017 | Gupta | B60Q 1/346 |
| 2017/0255966 A1* | 9/2017 | Khoury | G08G 1/0129 |
| 2017/0309092 A1* | 10/2017 | Rosenbaum | G07C 5/008 |
| 2017/0372431 A1* | 12/2017 | Perl | G06Q 20/10 |
| 2018/0107214 A1* | 4/2018 | Chandy | B62D 15/025 |
| 2018/0118219 A1* | 5/2018 | Hiei | B60W 40/09 |
| 2018/0141568 A1* | 5/2018 | Singhal | G01S 13/862 |
| 2018/0208195 A1* | 7/2018 | Hutcheson | G05D 1/0027 |
| 2018/0284766 A1* | 10/2018 | Minegishi | B60W 50/12 |
| 2018/0348759 A1* | 12/2018 | Freeman | G05D 1/0061 |
| 2019/0056019 A1* | 2/2019 | Ketchel | F16H 48/40 |
| 2019/0056731 A1* | 2/2019 | Westbrook | G05D 1/0061 |

FOREIGN PATENT DOCUMENTS

| | | |
|---|---|---|
| DE | 102014215258 | 2/2016 |
| WO | 2016020195 | 2/2016 |
| WO | 2016113231 | 7/2016 |

* cited by examiner

METHODS AND APPARATUS FOR AUTOMOTIVE DRIVE MODE SELECTION

FIELD OF THE DISCLOSURE

This disclosure relates generally to automotive vehicles, and, more particularly, to methods and apparatus for automotive drive mode selection.

BACKGROUND

In recent years, vehicles have become more automated with the increased sophistication of computerized systems. These computerized systems have the ability to change a state of a vehicle based on changing conditions around the vehicle, which are detected by sensors. For example, while operating, a computerized system can slow a vehicle approaching another vehicle too quickly or closely. Additionally, the computerized system may vary a vehicle mode based on changing conditions. For example, when the vehicle is in stop-and-go traffic, the computerized system may change to an economy mode to save fuel.

SUMMARY

An example method includes receiving information relating to a condition of a vehicle from a vehicle sensor module, comparing the information to a drive mode threshold, and selecting a drive mode change based on the information satisfying the drive mode threshold. The example method also includes sending the drive mode change to a first vehicle operation module, the first vehicle operation module operating at least one other vehicle operation module to adjust vehicle operation based on the drive mode change.

An example apparatus includes a vehicle control unit to receive information relating to a condition of a vehicle from a vehicle sensor module, compare the information to a drive mode threshold, and select a drive mode change based on the information satisfying the drive mode threshold. The example apparatus also includes the vehicle control unit to send the drive mode change to a first vehicle operation module, the first vehicle operation module to operate at least one other vehicle operation module to adjust vehicle operation based on the drive mode change.

An example non-transitory computer readable medium includes instructions that, when executed, cause a processor to, at least receive information relating to a condition of a vehicle from a vehicle sensor module, compare the information to a drive mode threshold, and select a drive mode change based on the information satisfying the drive mode threshold. The example non-transitory computer readable medium also includes instructions that, when executed, cause a processor to send the drive mode change to a first vehicle operation module, the first vehicle operation module to operate at least one other vehicle operation module to adjust vehicle operation based on the drive mode change.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
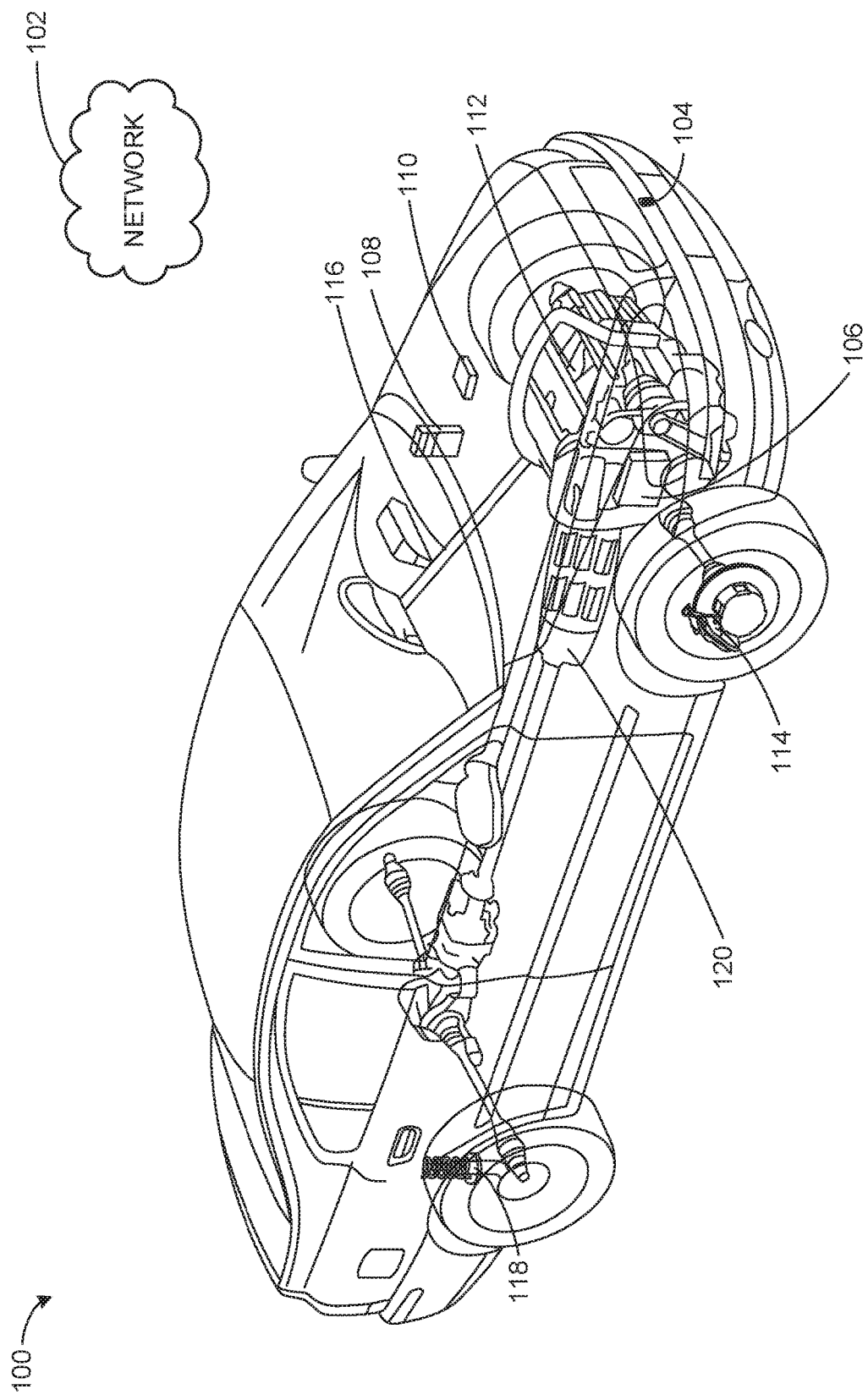
FIG. 1 is an example automotive vehicle in which the examples disclosed herein may be implemented.

Methods and apparatus for automotive drive mode selection are disclosed. Prior techniques for drive mode selection in vehicles include operating a control knob or selecting a touchscreen feature to operate the vehicle in a certain drive mode. For example, sport vs. winter. Many complications can arise when a driver has to manually activate a specific drive mode by switching to a specific letter or illustration on their console screen, knob, or button. For example, if a vehicle is stuck in deep snow and the driver may intuitively select the "snowflake" mode, representative of winter driving, when the "cactus" mode, representative of summer driving, may be more suitable because of increased powertrain and braking controls. Not only is it an inconvenience to have to manually switch from drive mode to drive mode in varying environmental conditions (e.g., weather conditions, terrain, etc.), but many drivers do not fully understand or even know what each specific drive mode does or how each drive mode affects the vehicle in certain driving scenarios. Further, activating a specific drive mode by switching to a specific illustration limits vehicle operation modules (e.g., engine module, steering module, brakes module, etc.) from operating in various drive modes. For example, switching to "cactus" mode switches all of the vehicle operation modules to operate "cactus" mode, but it may be more suitable for a brakes module to be in "snowflake" mode and an engine module to be in "cactus" mode.

Additionally, some automotive companies have computerized systems with preprogrammed drive modes that operate based on certain conditions detected by vehicle sensors. This is problematic because the computerized systems with preprogrammed drive modes do not take into account varying conditional needs that fall outside of their preprogrammed drive modes. For example, operating different vehicle operations modules in different drive modes.

The examples disclosed herein enable an actively adapting drive mode selection system of a vehicle by allowing a vehicle operation module to operate other vehicle operation modules based on information received from vehicle sensor modules each satisfying a drive mode threshold. The drive mode selection system is used for automatically selecting a drive mode for optimal vehicle operation.

In some examples disclosed herein, a vehicle control unit receives information (e.g., weather forecasts, GPS information, braking and acceleration information, etc.) from different vehicle sensor modules to select a suitable drive mode. In some examples, the vehicle sensor modules may include a vehicle camera, an imbedded modem, and a powertrain module. However, the vehicle sensor modules may include any of the numerous sensor modules known to those in the art. To assist in determining a drive mode, the vehicle sensor modules may be equipped to determine probability scores for certain categories identified by the vehicle control unit. For example, the vehicle camera may process images and identify a low number of traffic lights and/or signs, and a low number of vehicles. As such, the vehicle camera may calculate a probability score of 0.9 for an "on the highway" category, indicating that there is a 90% probability that the vehicle is traveling on the highway. Additionally, the other vehicle sensor modules may calculate a probability score for the same "on the highway" category and send the probability score information to the vehicle control unit. Alternatively, the vehicle control unit may send a list of N number of categories (e.g., weather, traffic, location, acceleration, temperature, etc.) to each of the vehicle sensor modules. The vehicle sensor modules may populate the list with a probability score for each category and send the populated list to the vehicle control unit for a desired duration (e.g., every 0.5 seconds, every 1.5 second, every 1.5 minute, etc.), for example. Additionally, the vehicle control unit may store the information received from the vehicle sensor modules for a desired period of time (e.g., 1 minute, 5 minutes, 1 hour, etc.) to identify patterns.

To determine an optimal drive mode, the vehicle control unit receives the probability scores from the vehicle sensor modules and weighs the probability scores based on a vehicle sensor module hierarchy. For example, the vehicle camera may determine a probability score of 0.3 for the "on the highway" category, and the imbedded modem may determine a probability score of 0.9 for the "on the highway" category. For the "on the highway" category, the imbedded modem sensor may be given more weight because the imbedded modem uses a GPS system with 99% accuracy for the "on the highway" category, for example. As such, the vehicle control unit may determine that the vehicle is on the highway. Additionally, the powertrain module may be given more weight for acceleration information over the imbedded modem because the powertrain module is directly detecting the vehicle powertrain components. In some examples, the vehicle control unit may use a combination of all the probability scores for an individual category.

After the vehicle sensor module information has been weighed, the vehicle control unit compares the probability scores to drive mode thresholds to determine a drive mode change. For example, the vehicle control unit may identify that the vehicle is traveling on the highway with a steady acceleration at 55 miles per hour (MPH). As such, the vehicle control unit may identify a drive mode change to comfort mode to reduce driver steering efforts. In some examples, the vehicle control unit may identify that the vehicle is rapidly accelerating. As such, the vehicle control unit may identify a drive mode change to sport mode. Alternatively, the vehicle control unit may identify specific vehicle operation modules to operate instead of changing the drive mode. For example, the vehicle control unit may identify the vehicle is approaching a crash while operating in economy mode. As such, the vehicle control unit may identify a drive mode change to sport mode steering to assist in avoiding the crash.

To change the drive mode of the vehicle, the vehicle control unit sends the drive mode change to a vehicle operation module (e.g., brake module, engine module, steering module, suspension module, transmission module, etc.) to operate other vehicle operation modules to adjust vehicle operations based on the drive mode change. For ease of description, the examples disclosed herein will be described using the brake module to operate other modules. However, any of the vehicle operation modules may be used to interact with the vehicle control unit. The brake module may receive the drive mode change from the vehicle control unit and analyse the drive mode change to determine the operation adjustments to send to each vehicle operation module. For example, the brake module may receive a drive mode change to a comfort mode. As such, the brake module may modify brake force, and may send an operation adjustment to the engine module to modify engine tune and exhaust noise, the suspension module to modify ride height, the steering module to modify steering control, and the transmission module to modify gear change conditions, for example. Once the vehicle operation modules have been adjusted the brake module may send output information to the vehicle control unit for verification. In some examples, the vehicle control unit may send a verification message to the brake module to continue operating the other vehicle operation modules in the current drive mode or the vehicle control unit may send another drive mode change to the brake module.

A set of drive modes such as manual, comfort, sport, and other modes as used herein are known in the art. These modes are commonly known and will not be explained in detail in the present disclosure, but it is understood that each mode corresponds to respective vehicle suspension settings (e.g., stiffness, real-time damping, etc.), acceleration response, and steering wheel power assist, engine responsiveness, transmission shifting point, and traction control, as examples.

FIG. 1 is an example automotive vehicle 100 in which the examples disclosed herein may be implemented. In the illustrated example of FIG. 1, the automotive vehicle 100 includes a network 102, a vehicle camera 104, a powertrain module 106, an imbedded modem 108, and a vehicle control unit 110. The automotive vehicle 100 also includes an engine module 112, a brakes module 114, a steering module 116, a suspension module 118, and a transmission module 120.

The example network 102 of the illustrated example is a wired or wireless network suitable for communicating information to the imbedded modem 108. The example network 102 may be implemented using a local area network and/or a wide area network (e.g., the Internet). However, any type(s) of past, current, and/or future communication network(s), communication system(s), communication device(s), transmission medium(s), protocol(s), technique(s), and/or standard(s) could be used to communicatively couple the components via any type(s) of past, current, and/or future device(s), technology(ies), and/or method(s), including voice-band modems(s), digital subscriber line (DSL) modem(s), cable modem(s), Ethernet transceiver(s), optical transceiver(s), virtual private network (VPN) connection(s), Institute of Electrical and Electronics Engineers (IEEE) 802.11x (e.g., WiFi) transceiver(s), IEEE 802.16 (e.g., WiMax), access point(s), access provider network(s), etc. Further, the example network 102 may be implemented by one or a combination(s) of any hardwire network, any wireless network, any hybrid hardwire and wireless network, a local area network, a wide area network, a mobile device network, a peer-to-peer network, etc. For example, a first network may connect the vehicle 100 to another vehicle in its proximity. As such, the other vehicle may transmit information to the vehicle 100. For example, the other vehicle may identify icy roads and determine a drive mode change to "snowflake" mode. The vehicle 100 may receive the drive mode change from the other vehicle and change to "snowflake" mode, for example. Alternatively, the other vehicle may identify icy roads and send the identification to the vehicle 100.

In the illustrated example, the example vehicle camera 104 is located in the front of the vehicle 100. However, more than one vehicle camera 104 may be utilized and may be located anywhere on the vehicle. The vehicle camera 104 is utilized to capture and process images of environmental conditions of the vehicle 100. For example, the vehicle camera 104 may capture images every half second and process the images to determine how many vehicles are present, how many traffic signs are present, determine road terrain (e.g., smooth road, rocky road, pot holes, etc.), determine weather conditions (e.g., snowing, raining, sunny), determine time of day, etc. Additionally, the vehicle camera 104 determines probability scores for categories identified by the vehicle control unit 110. After the vehicle camera 104 determines the probability scores for the categories, the vehicle camera 104 sends the information to the vehicle control unit 110 for further processing.

The example powertrain module 106 is utilized to determine acceleration information from the vehicle 100. The example powertrain module 106 may utilize various sensor attached to the vehicle powertrain. For example, a vehicle speed sensor, a wheel speed sensor, a throttle sensor, a turbine sensor, a transmission fluid temperature sensor, a kick down switch, a brake light switch, a traction control system. Additionally, the powertrain module 106 may utilize information from the engine module 112 and the transmission module 120. In some examples, the powertrain module 106 is a powertrain control module (PCM). During operation, the powertrain module 106 gathers information from various vehicle powertrain sensors, determines acceleration information for the vehicle 100 and calculates a probability score for the acceleration information and sends the information to the vehicle control unit 110.

The example imbedded modem 108 communicates with the network 102 to gather weather information, location information, and traffic information. In some examples, mobile devices may connect to the imbedded modem 108, and the imbedded modem 108 may gather road preview information and/or location information from the mobile devices. Additionally, the imbedded modem 108 may gather traffic information based on a user selected GPS route. In some examples, the imbedded modem 108 may gather information based on the list of categories from the vehicle control unit 110. For example, the vehicle control unit 110 may identify categories relating to traffic information. As such, the imbedded modem 108 may collect information relating to traffic information. Once the imbedded modem has gathered the necessary information, the imbedded modem 108 calculates a probability score for the categories identified by the vehicle control unit 110 and sends the information to the vehicle control unit 110.

The example vehicle control unit 110 receives the collected information from the vehicle camera 104, the powertrain module 106 and the imbedded modem 108 and weighs the probability scores based on a vehicle sensor module hierarchy. In some examples, the vehicle sensor module hierarchy is programmed into the vehicle control unit 110. The vehicle control unit 110 takes the weighted probability scores and compares them to drive mode thresholds to determine a drive mode change. For example, vehicle control unit 110 may identify dry weather conditions and curvy road surfaces ahead from the vehicle camera 104 and the imbedded modem 108. As such, the vehicle control unit 110 may identify a drive mode change to sport mode. In some examples, the vehicle control unit 110 may be programmed with a list of categories necessary to determine a drive mode change. As such, the vehicle control unit 110 may send the list of categories to the vehicle camera 104, the powertrain module 106, and the imbedded modem 108 to collect the necessary information to determine a drive mode change. In some examples, the vehicle control unit 110 may be installed in a vehicle communications and entertainment system. In some examples, the vehicle control unit 110 may restrict the driver from changing a drive mode.

The example engine module 112 controls a series of actuators on an engine to ensure optimal engine performance. For example, the engine module 112 receives a drive mode change and adjusts the engine actuators accordingly. In the illustrated example, the engine is a combustion engine, but any type of engine (e.g., external combustion, internal combustion engine, electric engine, etc.) may be utilized.

The example brakes module 114 controls the vehicle 100 braking system by adjusting brake actuators and valves based on a drive mode change received from the vehicle control unit 110. In the illustrated example, the brake module 114 operates the engine module 112, the steering module 116, the suspension module 118, and the transmission module 120 to adjust vehicle operations.

The example steering module 116 controls a series of actuators on the vehicle 100 steering system to ensure optimal steering performance. For example, the steering module 116 may receive a drive mode change from the brake module 114 and adjust steering actuators accordingly.

The example suspension module 118 controls a series of actuators on the vehicle 100 suspension system to ensure optimal suspension performance. For example, the suspension module 118 may receive a drive mode change from the brake module 114 and adjust suspension actuators accordingly.

The example transmission module 120 controls a series of actuators and gears on the vehicle 100 transmission system to ensure optimal transmission performance. For example, the transmission module 120 may receive a drive mode change from the brake module 114 and adjust transmission actuators and gears accordingly.

In the illustrated example of FIG. 1, the example engine module 112, the example brakes module 114, the example steering module 116, the example suspension module 118, and the example transmission module 120 are located at their respective components in the vehicle 100. However, the example engine module 112, the example brakes module 114, the example steering module 116, the example suspension module 118, and the example transmission module 120 may be located near the vehicle control unit 110. Additionally, the example engine module 112, the example brakes module 114, the example steering module 116, the example suspension module 118, and the example transmission module 120 are commonly known and will not be explained in detail in the present disclosure, but it is understood that each module corresponds to respective vehicle suspension settings (e.g., stiffness, real-time damping, etc.), acceleration response, and steering wheel power assist, engine responsiveness, transmission shifting point, and traction control, as examples.

Figure 2:
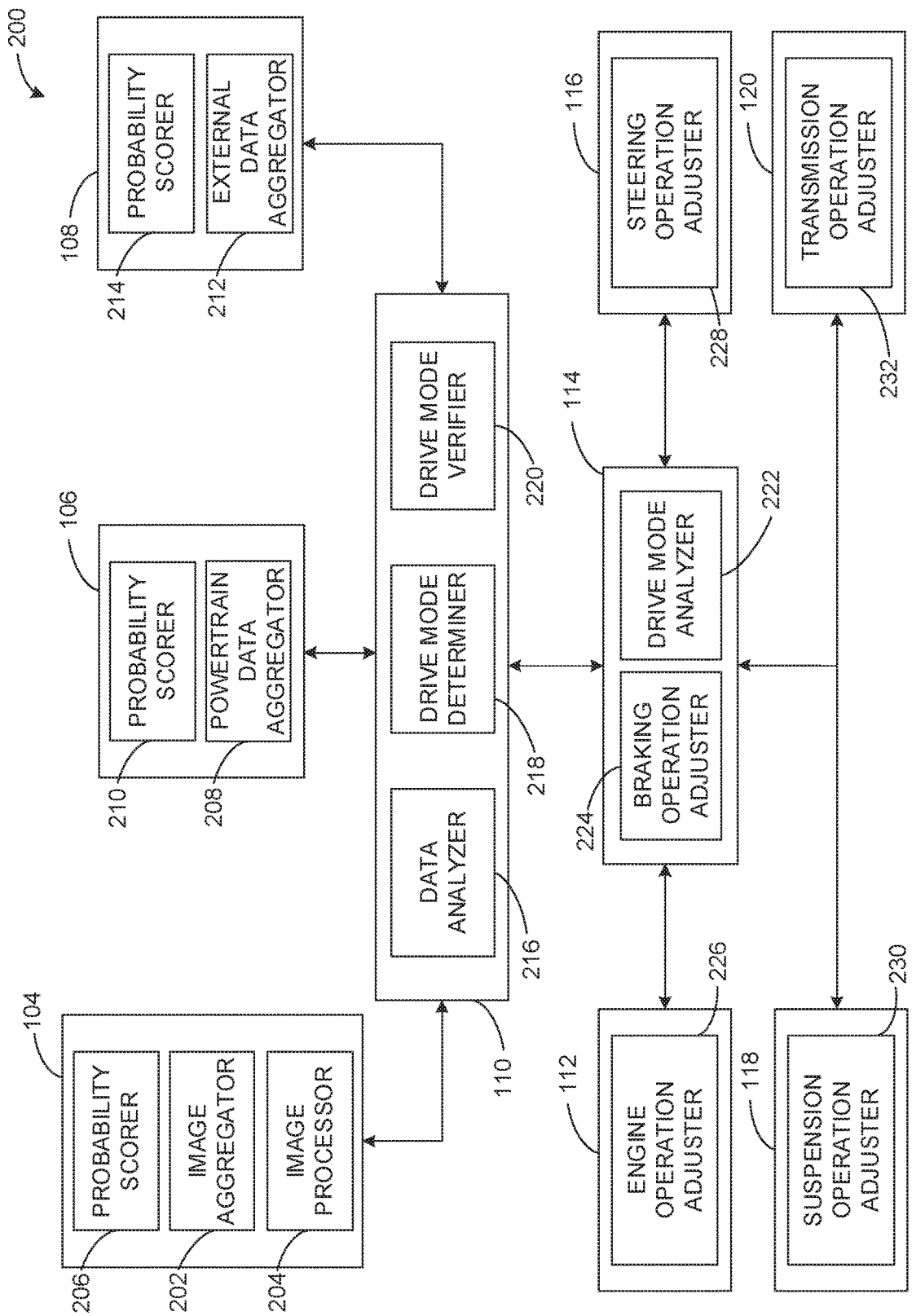
FIG. 2 illustrates an example drive mode selection system that may be used to implement the examples disclosed herein.

FIG. 2 illustrates an example drive mode selection system 200 that may be used to implement the examples disclosed herein. The example drive mode selection system 200 includes the vehicle camera 104, the powertrain module 106, the imbedded modem 108, the vehicle control unit 110, the engine module 112, the brakes module 114, the steering module 116, the suspension module 118, and the transmission module 120. The vehicle camera 104 includes an example image aggregator 202, an example image processor 204, and an example probability scorer 206. The powertrain module 106 includes an example powertrain data aggregator 208 and an example probability scorer 210. The imbedded modem 108 includes an example external data aggregator 212 and an example probability scorer 214. The vehicle control unit 110 includes an example data analyzer 216, an example drive mode determiner 218, and an example drive mode verifier 220. The brake module 114 includes an example drive mode analyzer 222 and an example braking operation adjuster 224. The engine module 112 includes an example engine operation adjuster 226. The steering module 116 includes an example steering operation adjuster 228. The suspension module 118 includes an example suspension operation adjuster 230. The transmission module 120 includes an example transmission operation adjuster 232.

The example image aggregator 202 collects images while the vehicle 100 is traveling. The image aggregator 202 may collect images for a specified period of time (e.g., 0.5 seconds, 1 second, 5 seconds, etc.) and send the images to the image processor 204. The image processor 204 processes the images using known image processing techniques to identify objects in the images. For example, the image processor 204 may process the images from the image aggregator 202 to identify road conditions, weather conditions, traffic signs, traffic lights, vehicles in the area, etc. Once the image processor 204 processes the images, the probability scorer 206 determines a probability score based on the objects identified in the image. For example, the probability scorer 206 may be equipped with thresholds for individual categories. As such, the image processor 204 may identify zero cars in proximity to the vehicle 100 and zero traffics signs or traffic lights in any images, and the probability scorer 206 may identify a 0.9 probability score for an "on the highway" category, for example. The probability scorer 206 may populate a list of categories specified by the vehicle control unit 110 and send the populated list to the vehicle control unit 110 for further processing.

The powertrain data aggregator 208 collects data from sensors distributed along the vehicle's 100 powertrain components. The powertrain data aggregator 208 collects the powertrain sensor data and the probability scorer 210 determines a probability score based on the powertrain sensor data. In some examples, the probability scorer 210 may be equipped with thresholds for individual categories. For example, the probability scorer 210 may determine that the powertrain components are operating the vehicle 100 at 55 MPH with a probability score of 1, indicating a 100% probability. The probability scorer 210 may populate a list of categories specified by the vehicle control unit 110 and send the populated list to the vehicle control unit 110 for further processing.

The external data aggregator 212 collects external data from the network 102 relating to weather, traffic, speed, road conditions, etc. The probability scorer 214 determines a probability score based on the external data collected by the external data aggregator 212. In some example, the probability scorer 214 is equipped with thresholds for individual categories. For example, the probability scorer 214 may determine that the vehicle 100 is traveling on highway XYZ. As such, the probability scorer 214 may determine a probability score of 1 for an "on the highway" category. The probability scorer 214 may populate a list of categories specified by the vehicle control unit 110 and send the populated list to the vehicle control unit 110 for further processing.

In the illustrated example, the example probability scorer 206, 210, 214 are shown in their respective modules. However, the probability scorer 206, 210, 214 may be implemented in the vehicle control unit 110.

The example data analyzer 216 receives the populated lists from the probability scorer 206, 210, 214 and weights the probability scores based on a vehicle sensor module hierarchy. For example, the probability scores from probability scorer 214 may be given more weight than the probability scores from probability scorer 206 for an "on the highway" category. As such, the probability scores from the probability scorer 214 are used for the "on the highway" category. Additionally, certain categories may take into account all the probability scores from each probability scorer 206, 210, 214 in determining a final probability score. The data analyzer 216 may determine final probabilities for the categories and forward the final list to the drive mode determiner 218. The drive mode determiner 218 compares the final probability scores determined by the data analyzer 216 to drive mode change thresholds. For example, the drive mode determiner 218 may determine from the final probability scores that the vehicle 100 is traveling on the highway at 55 MPH with zero vehicle in its proximity. As such, the drive mode determiner 218 may determine a drive mode change to comfort mode, for example. In some examples, the drive mode determiner 218 may identify that there is an influx of traffic and heavy stop and go usage and may determine a drive mode change to economy mode to save fuel economy. In some examples, the drive mode determiner 218 may identify weather information indicating rain or snow in the future or vehicle sensor modules may detect precipitation. As such, the drive mode determiner 218 may determine a drive mode change to a "snow/wet" mode. In some examples, the drive mode determiner 218 may identify dry weather conditions and curvy road surfaces ahead. As such, drive mode determiner 218 may determine a drive mode change to sport mode. In some examples, the drive mode determiner 218 may identify that vehicle 100 will maintain course on a relatively straight highway for an extended period of time. As such, the drive mode determiner 218 may determine a drive mode change to comfort mode. In some examples, the drive mode determiner 218 may identify that the vehicle 100 is stuck in mud or large amounts of snow. As such, drive mode determiner 218 may determine a drive mode change where traction and stability control are disabled to allow wheel spin. In some examples, the drive mode determiner 218 may identify difficult terrain or poor roads. As such, the drive mode determiner 218 may determine a drive mode change to a mode that lightens steering control, maximizes ground clearance and enables AWD and Hill Descent Control.

The drive mode verifier 220 receives the drive mode change from the drive mode determiner 218 and verifies the vehicle operation modules (112, 114, 116, 118, 120) are operating in the drive mode change. For example, the drive mode verifier 220 receives output information from brake module 114 indicating operation conditions for the other vehicle operation modules (112, 116, 118, 120). The drive mode verifier 220 compares the operation conditions from the vehicle operation modules (112, 114, 116, 118, 120) to a verification threshold (e.g., the drive mode change from the drive mode determiner 218) and either sends a verification message to the brake module 114 indicating the vehicle operation modules (112, 114, 116, 118, 120) are operating properly, or sends and adjustment message to the brake module 114 indicating which vehicle operation modules (112, 114, 116, 118, 120) need to be adjusted to operate in the specified drive mode.

The example drive mode analyzer 222 analyzes the drive mode change from the drive mode determiner 218 and determines which vehicle operation modules (112, 114, 116, 118, 120) need to be adjusted to operate in the specified drive mode. In some examples, the drive mode analyzer 222 is equipped with drive mode operation conditions for each drive mode change. For example, when the drive mode determiner 218 determines a drive mode change to comfort mode, the drive mode analyzer 222 may have specified operation conditions for comfort mode and may relay the specified conditions to the braking operation adjuster 224 to adjust the operation of the brakes of the vehicle 100 to comfort mode, the engine operation adjuster 226 to adjust operation of the engine of the vehicle 100 to comfort mode, the steering operation adjuster 228 to adjust the operation of the steering system of the vehicle 100 to comfort mode, the suspension operation adjuster 230 to adjust the operation of the suspension of the vehicle 100 to comfort mode, and the transmission operation adjuster 232 to adjust the transmission of the vehicle 100 to comfort mode. Once the braking operation adjuster 224, the engine operation adjuster 226, the steering operation adjuster 228, the suspension operation adjuster 230, and the transmission operation adjuster 232 have adjusted their respective components, the brake module 114 sends output information to the vehicle control unit 110 for verification.

In some examples, the example drive mode analyzer 222 analyzes the drive mode change from the drive mode determiner 218 and determines a drive mode change to comfort/sport/economy mode, the drive mode analyzer 222 may have specified operation conditions for comfort/sport/ economy mode and may relay the specified conditions to the braking operation adjuster 224 to adjust the operation of the brakes of the vehicle 100 to comfort mode, the engine operation adjuster 226 to adjust operation of the engine of the vehicle 100 to sport mode, the steering operation adjuster 228 to adjust the operation of the steering system of the vehicle 100 to sport mode, the suspension operation adjuster 230 to adjust the operation of the suspension of the vehicle 100 to economy mode, and the transmission operation adjuster 232 to adjust the transmission of the vehicle 100 to comfort mode.

While an example manner of implementing the example vehicle camera 104, the example powertrain module 106, the example imbedded modem 108, the example vehicle control unit 110, the example engine module 112, the example brake module 114, the example steering module 116, the example suspension module 118, and the example transmission module 120 of the example vehicle 100 of FIG. 1 is illustrated in FIG. 2, one or more of the elements, processes and/or devices illustrated in FIG. 2 may be combined, divided, re-arranged, omitted, eliminated and/or implemented in any other way. Further, the example image aggregator 202, the example image processor 204, the example probability scorer 206, an/or, more generally, the example vehicle camera 104, the example powertrain data aggregator 208, the example probability scorer 210, and/or, more generally, the example powertrain module 106, the example external data aggregator 212, the example probability scorer 214, and/or, more generally, the example imbedded modem 108, the example data analyzer 216, the example drive mode determiner 218, the example drive mode verifier 220, and/or, more generally, the example vehicle control unit 110, the example drive mode analyzer 222, the example braking operation adjuster 224, and/or, more generally, the example brake module 114, the example engine operation adjuster 226, and/or, more generally, the example engine module 112, the example steering operation adjuster 228, and/or, more generally, the example steering module 116, the example suspension operation adjuster 230, and/or, more generally, the example suspension module 118, the example transmission operation adjuster 232, and/or, more generally, the example transmission module 120 may be implemented by hardware, software, firmware and/or any combination of hardware, software and/or firmware. Thus, for example, any of the example image aggregator 202, the example image processor 204, the example probability scorer 206, an/or, more generally, the example vehicle camera 104, the example powertrain data aggregator 208, the example probability scorer 210, and/or, more generally, the example powertrain module 106, the example external data aggregator 212, the example probability scorer 214, and/or, more generally, the example imbedded modem 108, the example data analyzer 216, the example drive mode determiner 218, the example drive mode verifier 220, and/or, more generally, the example vehicle control unit 110, the example drive mode analyzer 222, the example braking operation adjuster 224, and/or, more generally, the example brake module 114, the example engine operation adjuster 226, and/or, more generally, the example engine module 112, the example steering operation adjuster 228, and/or, more generally, the example steering module 116, the example suspension operation adjuster 230, and/or, more generally, the example suspension module 118, the example transmission operation adjuster 232, and/or, more generally, the example transmission module 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image aggregator 202, the example image processor 204, the example probability scorer 206, an/or, more generally, the example vehicle camera 104, the example powertrain data aggregator 208, the example probability scorer 210, and/or, more generally, the example powertrain module 106, the example external data aggregator 212, the example probability scorer 214, and/or, more generally, the example imbedded modem 108, the example data analyzer 216, the example drive mode determiner 218, the example drive mode verifier 220, and/or, more generally, the example vehicle control unit 110, the example drive mode analyzer 222, the example braking operation adjuster 224, and/or, more generally, the example brake module 114, the example engine operation adjuster 226, and/or, more generally, the example engine module 112, the example steering operation adjuster 228, and/or, more generally, the example steering module 116, the example suspension operation adjuster 230, and/or, more generally, the example suspension module 118, the example transmission operation adjuster 232, and/or, more generally, the example transmission module 120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle camera 104, the example powertrain module 106, the example imbedded modem 108, the example vehicle control unit 110, the example engine module 112, the example brake module 114, the example steering module 116, the example suspension module 118, and the example transmission module 120 of the example vehicle 100 of FIG. 1 may include one or more elements, processes and/or devices in addition to, or instead of, those illustrated in FIG. 2, and/or may include more than one of any or all of the illustrated elements, processes and devices.

Figure 3:
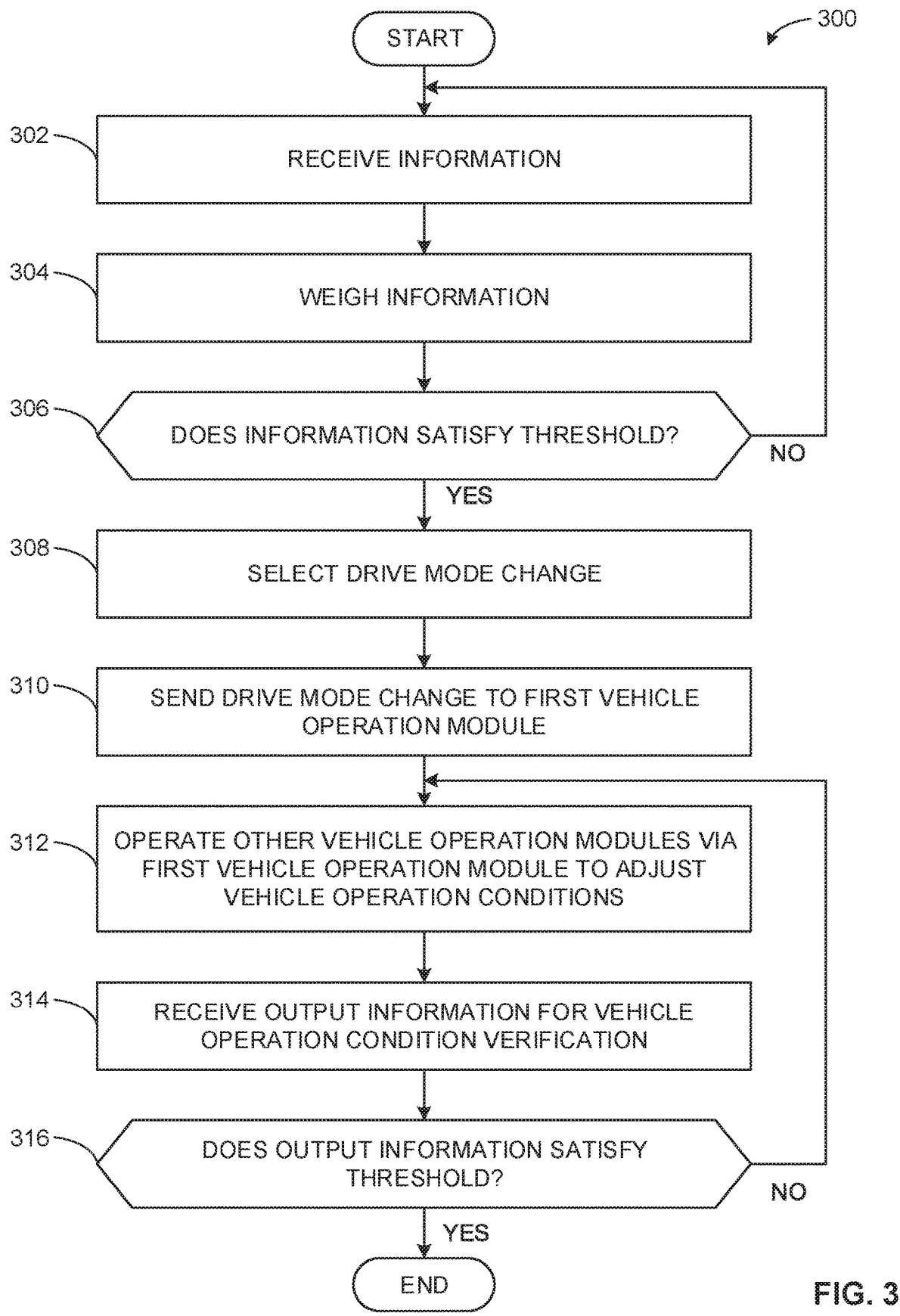
FIG. 3 is a flowchart of an example method that may be used to implement the example drive mode selection system of FIG. 2.
Figure 4:
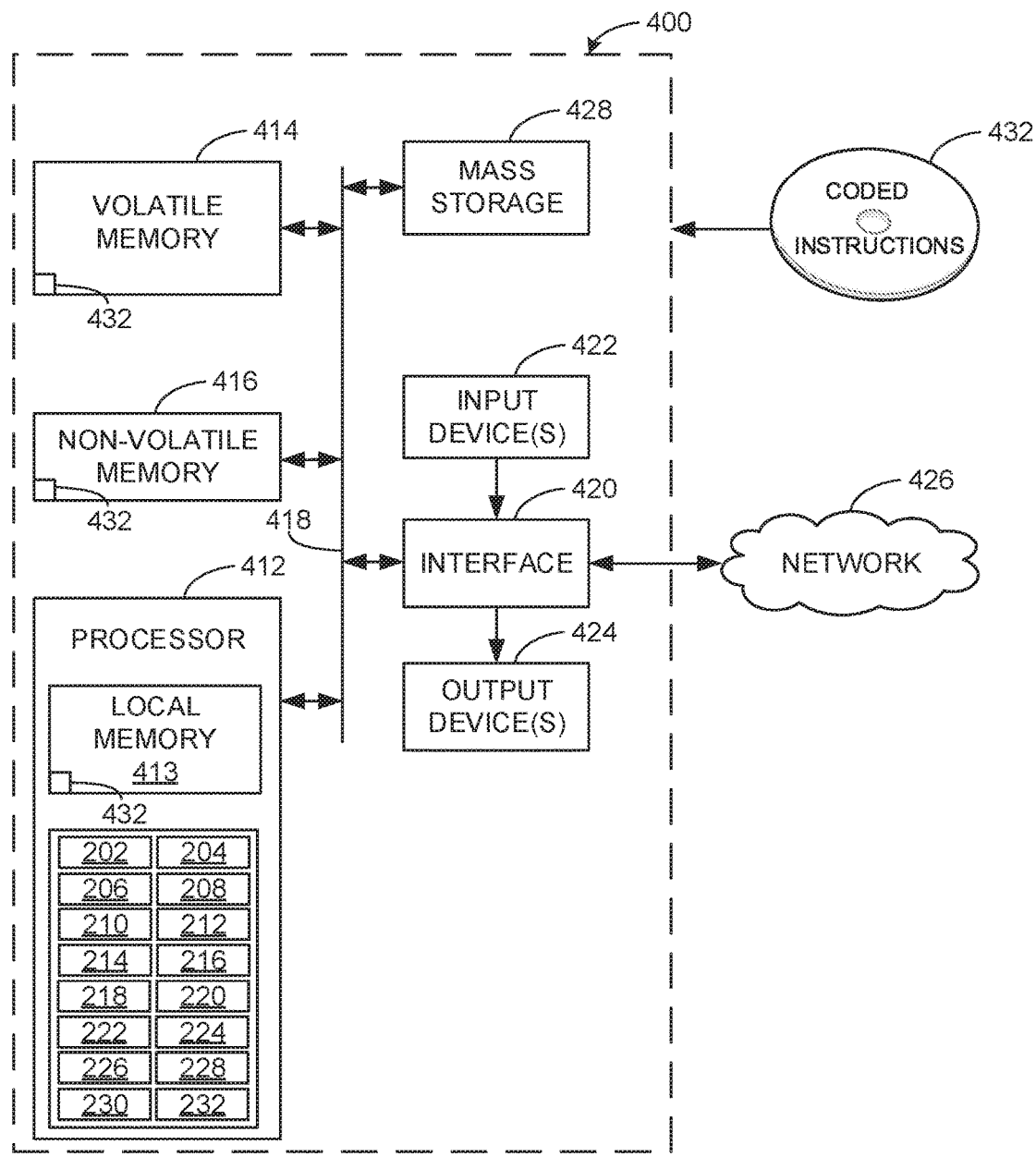
FIG. 4 is a block diagram of an example processor platform capable of executing machine readable instructions to implement the example method of FIG. 3 and/or the drive mode selection system of FIG. 2.

A flowchart representative of an example method for implementing the example drive mode selection system 200 of FIG. 2 is shown in FIG. 4. In this example, the methods may be implemented using machine readable instructions comprise a program for execution by a processor such as the processor 412 shown in the example processor platform 400 discussed below in connection with FIG. 4. The program may be embodied in software stored on a non-transitory computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example drive mode selection system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example method 300 of FIG. 3 begins when the vehicle 100 begins operating/moving and the vehicle camera 104, the powertrain module 106, and the imbedded modem 108 collect data relating to a condition of the vehicle 100 and calculate probability scores for a list of categories.

According to the illustrated example, the data analyzer 216 receives information (block 302). For example, the data analyzer 216 receives the probability scores from the vehicle camera 104, the powertrain module 106, and the imbedded modem 108.

In this example, the data analyzer 216 weighs the information (block 304). For example, the data analyzer 216 analyzes the probability scores based on a vehicle sensor module hierarchy to calculate final probability scores for the list of categories. However, in some examples, the data analyzer 216 may omit weighting the information and proceed directly to block 306.

In this example, the drive mode determiner 218 determines if the information satisfies a threshold (block 306). For example, the drive mode determiner 218 determines if the probability scores from the data analyzer 216 satisfy drive mode thresholds (e.g., comfort mode, sport mode, normal mode, etc.). If the information does not satisfy a threshold, the method returns to block 302. If the information does satisfy a threshold, the drive mode determiner 218 selects a drive mode change (block 308). For example, the drive mode determiner 218 may determine that the vehicle 100 is traveling on the highway at 55 MPH with zero vehicles in its proximity. As such, the drive mode determiner 218 may determine a drive mode change to comfort mode, for example.

According to the illustrated example, the drive mode determiner 218 sends the drive mode change to a first vehicle operation module (block 310). For example, the drive mode determiner 218 may send the drive mode change to the brake module 114. The brake module 114 may operate other vehicle operation modules to adjust vehicle operation conditions (block 312). For example, the example drive mode analyzer 222 analyzes the drive mode change from the drive mode determiner 218 and determines which vehicle operation modules (112, 114, 116, 118, 120) need to be adjusted to operate in the specified drive mode.

In this example, the drive mode verifier 220 receives output information for vehicle operation condition verification (block 314). In the illustrated example, the drive mode verifier 220 determines if the output information satisfies a threshold (block 316). If the information does not satisfy the threshold, the process returns to block 310. If the information does satisfy the threshold, the process ends. For example, the drive mode verifier 220 may receive operation condition information from the brake module 114 to determine if the vehicle operation modules (112, 114, 116, 118, 120) are operating in the specified drive mode. If the drive mode verifier 220 determines that any of the vehicle operation modules are not operating in the specified drive mode, the drive mode verifier 220 may send a message to the brake module 114 to adjust operation of the vehicle operation modules not operating in the specified drive mode.

FIG. 4 is a block diagram of an example processor platform 400 capable of executing the instructions of FIG. 3 to implement the example method of FIG. 3 to implement the example drive mode operation system 200 of FIG. 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. The hardware processor may be a semiconductor based (e.g., silicon based) device. In this example, the processor 1012 implements the example image aggregator 202, the example image processor 204, the example probability scorer 206, an/or, more generally, the example vehicle camera 104, the example powertrain data aggregator 208, the example probability scorer 210, and/or, more generally, the example powertrain module 106, the example external data aggregator 212, the example probability scorer 214, and/or, more generally, the example imbedded modem 108, the example data analyzer 216, the example drive mode determiner 218, the example drive mode verifier 220, and/or, more generally, the example vehicle control unit 110, the example drive mode analyzer 222, the example braking operation adjuster 224, and/or, more generally, the example brake module 114, the example engine operation adjuster 226, and/or, more generally, the example engine module 112, the example steering operation adjuster 228, and/or, more generally, the example steering module 116, the example suspension operation adjuster 230, and/or, more generally, the example suspension module 118, the example transmission operation adjuster 232, and/or, more generally, the example transmission module 120

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

Coded instructions 432 to implement the method of FIG. 3 may be stored in the mass storage device 428, in the volatile memory 414, in the non-volatile memory 416, and/or on a removable tangible computer readable storage medium such as a CD or DVD.

From the foregoing, it will be appreciated that example methods, apparatus and articles of manufacture enable and actively adapting drive mode operation system that automatically puts the vehicle in the best mode for optimal control. One advantage over previous solutions is the drive mode actively adapts on its own to the given environmental and vehicle conditions. This is beneficial to reduce driver distraction as well as increase efficiency and safety in autonomous vehicles.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   receiving information relating to a condition of a vehicle from a vehicle sensor module;
   comparing the information to a drive mode threshold;
   selecting a drive mode change based on the information satisfying the drive mode threshold; and
   sending the drive mode change to a brake module of the vehicle, the brake module operating at least one other operation module of the vehicle to adjust vehicle operation based on the drive mode change.

2. The method of claim 1, wherein the information includes a probability score relating to the condition of the vehicle.

3. The method of claim 2, further including:
   weighting the probability score based on a vehicle sensor module hierarchy; and
   comparing the weighted probability score to the drive mode threshold to determine the drive mode change.

4. The method of claim 1, wherein the drive mode threshold includes a threshold for an individual drive mode change, the individual drive mode change including vehicle operation conditions for the individual drive mode change.

5. The method of claim 1, further including receiving output information for vehicle operation condition verification from the brake module and the at least one other operation module of the vehicle.

6. The method of claim 5, further including the brake module adjusting vehicle operation conditions until a vehicle operation condition verification threshold has been satisfied.

7. The method of claim 1, further including receiving a drive mode change completion update from the brake module and sending information for another drive mode change based on the drive mode change completion update.

8. The method of claim 1, further including receiving information from an imbedded modem module, the imbedded modem module to receive information from a network relating to an environmental condition of the vehicle.

9. The method of claim 1, wherein the at least one other operation module includes at least one of an engine module, a steering module, a suspension module, or a transmission module.

10. The method of claim 9, further including the brake module operating at least one of the engine module, the steering module, the suspension module, or the transmission module to adjust vehicle operation based on the drive mode change; and
   receiving a drive mode completion update from the brake module.

11. An apparatus comprising:
a vehicle control unit to:
receive first information relating to a condition of a vehicle from a vehicle sensor module;
compare the first information to a drive mode threshold;
select a drive mode change based on the first information satisfying the drive mode threshold;
send the drive mode change to a first operation module of the vehicle, the first operation module to operate at least one other operation module of the vehicle to adjust vehicle operation based on the drive mode change; and
receive output information for vehicle operation condition verification from the first operation module, the first operation module to adjust vehicle operation conditions until a vehicle operation condition verification threshold has been satisfied.

12. The apparatus of claim 11, wherein the first information includes a probability score relating to the condition of the vehicle, the vehicle control unit to weight the probability score based on a vehicle sensor module hierarchy.

13. The apparatus of claim 12, further including the vehicle control unit to compare the weighted probability score to the drive mode threshold to determine the drive mode change.

14. The apparatus of claim 11, wherein the drive mode threshold includes a threshold for an individual drive mode change, the individual drive mode change including vehicle operation conditions for the individual drive mode change.

15. The apparatus of claim 11, further including receiving a drive mode change completion update from the first operation module, the vehicle control unit to send information for another drive mode change based on the drive mode change completion update.

16. The apparatus of claim 11, wherein the first operation module is a brake module and the at least one other operation module includes at least one of an engine module, a steering module, a suspension module, or a transmission module.

17. An non-transitory computer readable medium comprising instructions that, when executed, cause a processor to, at least:
receive information relating to a condition of a vehicle from a vehicle sensor module;
compare the information to a drive mode threshold;
select a drive mode change based on the information satisfying the drive mode threshold; and
send the drive mode change to a brake module of the vehicle, the brake module to operate at least one other operation module of the vehicle to adjust vehicle operation based on the drive mode change.

18. The computer readable medium as defined in claim 17, wherein the instructions, when executed, further cause the processor to weight a probability score received in the information based on a vehicle sensor module hierarchy, and compare the weighted probability score to the drive mode threshold to determine the drive mode change.

19. The computer readable medium as defined in claim 17, wherein the drive mode threshold includes a threshold for an individual drive mode change, the individual drive mode change including vehicle operation conditions for the individual drive mode change.

20. The computer readable medium as defined in claim 17, wherein the instructions, when executed, further cause the processor to receive output information for vehicle operation condition verification, and adjust vehicle operation conditions until a vehicle operation condition verification threshold has been satisfied.

21. The computer readable medium as defined in claim 20, wherein the instructions, when executed, further cause the processor to receive a drive mode change completion update, and send information for another drive mode change based on the drive mode change completion update.

* * * * *